US005327344A

United States Patent [19]

Hoffman et al.

[11] Patent Number: 5,327,344

[45] Date of Patent: Jul. 5, 1994

[54] METHOD AND APPARATUS FOR RECONFIGURING A COMPUTERIZED MONITORING SYSTEM

[75] Inventors: John P. Hoffman, Peoria; Ricky D. Vance, Washington; Dennis A. Barney, Morton; Joseph G. Kozlevcar, Peoria, all of Ill.

[73] Assignee: Caterpillar Inc., Peoria, Ill.

[21] Appl. No.: 945,463

[22] Filed: Sep. 16, 1992

[51] Int. Cl.$^5$ ........................ B60Q 1/00; G06F 15/20

[52] U.S. Cl. ........................ 364/424.03; 340/439; 359/609

[58] Field of Search ........................ 364/424.03, 424.01; 340/438, 439, 461, 462, 469, 478, 483; 359/609, 613

[56] References Cited

U.S. PATENT DOCUMENTS

| | | | |
|---|---|---|---|
| 3,516,063 | 6/1970 | Arkin et al. | 340/163 |
| 3,964,302 | 6/1976 | Gordon et al. | 73/117.3 |
| 4,197,650 | 4/1980 | Bailey et al. | 33/143 L |
| 4,223,302 | 9/1980 | Hocking | 340/525 |
| 4,442,424 | 4/1984 | Shirasaki et al. | 540/52 F |
| 4,551,801 | 11/1985 | Sokol | 364/424 |
| 4,812,744 | 3/1989 | Havel | 324/115 |
| 4,815,824 | 3/1989 | Sharples | 350/336 |
| 4,926,331 | 5/1990 | Windle et al. | 364/424.04 |
| 4,967,143 | 10/1990 | Raviglione et al. | 324/73.1 |
| 4,975,848 | 12/1990 | Abe et al. | 364/424.03 |
| 4,977,389 | 12/1990 | Shiraishi | 340/461 |
| 5,034,889 | 7/1991 | Abe | 364/424.04 |
| 5,036,437 | 7/1991 | Macks | 362/61 |
| 5,041,980 | 8/1991 | Maddock et al. | 364/431.03 |
| 5,050,080 | 9/1991 | Abe | 364/424.04 |
| 5,091,858 | 2/1992 | Paielli | 364/431.12 |
| 5,150,257 | 9/1992 | Mohabbatizadeh et al. | 359/601 |
| 5,150,609 | 9/1992 | Ebner et al. | 73/117.3 |
| 5,157,610 | 10/1992 | Asano et al. | 364/424.03 |
| 5,214,582 | 5/1993 | Gray | 364/424.03 |
| 5,223,814 | 6/1993 | Suman | 340/525 |
| 5,257,190 | 10/1993 | Crane | 364/424.03 |

FOREIGN PATENT DOCUMENTS

| | | |
|---|---|---|
| 3837592 A1 | 5/1990 | Fed. Rep. of Germany . |
| 60-107109 | 6/1985 | Japan . |
| WO92/04693 | 3/1992 | PCT Int'l Appl. . |

OTHER PUBLICATIONS

Caterpillar Service Manual—Computerized Monitoring System With LCD Bargraph Gauges—dated Nov. 1991.

Journal article believed to have been published on or about Jan. 1990, entitled "All On Board With O & K" and sales literature attached thereto.

Caterpillar Service Manual—"Systems Operation Testing and Adjusting—Computerized Monitoring System with Liquid Crystal Display", published on or about Oct. 1990.

*Primary Examiner*—Thomas G. Black
*Assistant Examiner*—Susan Wieland
*Attorney, Agent, or Firm*—Steven R. Janda

[57] ABSTRACT

Instruments are often designed to operate in connection with a variety of machine types. Advantageously, the instrument is capable of modifying the appearance and function of its displays in response to the machine to which the instrument is connected. The subject invention includes a device for producing an identification code and a plurality of gauges for indicating levels of the sensed parameters. Each of the gauges has an outline segment for illustrating a range of levels of the sensed parameter indicated by the gauge and a symbol for identifying the sensed parameter indicated by the gauge. A controller receives the identification code and selectively enables one or more of the plurality of gauges and illuminates the outline segment and symbol associated with each of the enabled gauges in response to the identification code.

19 Claims, 9 Drawing Sheets

METHOD AND APPARATUS FOR RECONFIGURING A COMPUTERIZED MONITORING SYSTEM

TECHNICAL FIELD

The invention relates generally to displaying the level of sensed parameters on a machine and, more particularly, to a method and apparatus for selectively altering the format and functionality of the instrument in response to being connected to one of a plurality of machines.

BACKGROUND ART

In a variety of engine-powered vehicles, monitoring and diagnostic devices are employed to detect the presence of various undesirable operating conditions, such as overheating of the engine, low oil pressure, low fuel, and the like, and indicators are provided to warn the operator of such conditions. These instruments are typically connected to various sensors and switches for monitoring or controlling conditions on the vehicle via a wire harness and/or a communication link. In many applications, these instruments are also connected to electronic control systems, for example electronic engine controls, electronic transmission controls, and the like.

Most prior art systems have included dedicated instruments in which the functions and conditions of the vehicle to be monitored or diagnosed, as well as the particular sensors provided on the vehicle, are identified in advance. Therefore, the instruments are specifically designed for and hence "dedicated" to the monitoring or diagnosing of those particular vehicle functions and conditions in response to signals from pre-identified sensors. Accordingly, such "dedicated" instruments generally cannot be readily modified to accommodate different machines, different sensors and/or different conditions and functions. Rather, such instruments are generally limited to use with a particular vehicle type or model for which the instrument has been designed.

However, it is advantageous for these instruments to be usable in connection with many different machines. Lower costs will be achieved and less warehousing space will be required if a single instrument can be manufactured which can be used in many different applications. Similarly, service time is reduced if software changes are avoided when an instrument is moved from one machine to another.

Some prior art systems have provided for standardized monitoring systems that are usable in connection with a variety of machines, for example the system shown in U.S. Pat. Nos. 4,551,801 issued to Sokol on Nov. 5, 1985. While being an improvement over dedicated systems, this monitoring system is still relatively inflexible and requires the addition or subtraction of monitoring modules and the use of decals to indicate the parameters being shown by each display module.

In some situations the instrument also communicates sensor information to one or more external electronic controls. Since different data is required by different controls and in connection with different machines, it is desirable to reduce traffic on the communications link by communicating only information that is required by the controls on the particular machine to which the instrument is connected.

The present invention is directed to overcoming one or more of the problems set forth above.

DISCLOSURE OF THE INVENTION

The invention avoids the disadvantages of known monitoring systems and provides a flexible system usable in connection with a variety of machines.

In one aspect of the invention, an apparatus is provided for indicating levels of sensed parameters on a machine. The apparatus includes a device for producing an identification code and a plurality of gauges for indicating levels of the sensed parameters. Each of the gauges has an outline segment for illustrating a range of levels of the sensed parameter indicated by the gauge and a symbol for identifying the sensed parameter indicated by the gauge. A controller receives the identification code and selectively enables one or more of the plurality of gauges and illuminates the outline segment and symbol associated with each of the enabled gauges in response to the identification code.

In another aspect of the invention, a method for indicating levels of sensed parameters on a vehicle is provided. The method includes the steps of producing an identification code; indicating a level of the sensed parameters on a plurality of gauges, each of the gauges has an outline segment for illustrating a range of levels of the sensed parameter being indicated by the gauge and a symbol for identifying the sensed parameter indicated by each gauge; receiving the identification code by a controller; and selectively enabling one or more of the gauges and illuminating the outline segment and symbol associated with each of the enabled gauges in response to the identification code.

The invention also includes other features and advantages that will become apparent from a more detailed study of the drawings and specification.

BRIEF DESCRIPTION OF THE DRAWINGS

For a better understanding of the present invention, reference may be made to the accompanying drawings in which.

BEST MODE FOR CARRYING OUT THE INVENTION

Figure 1:
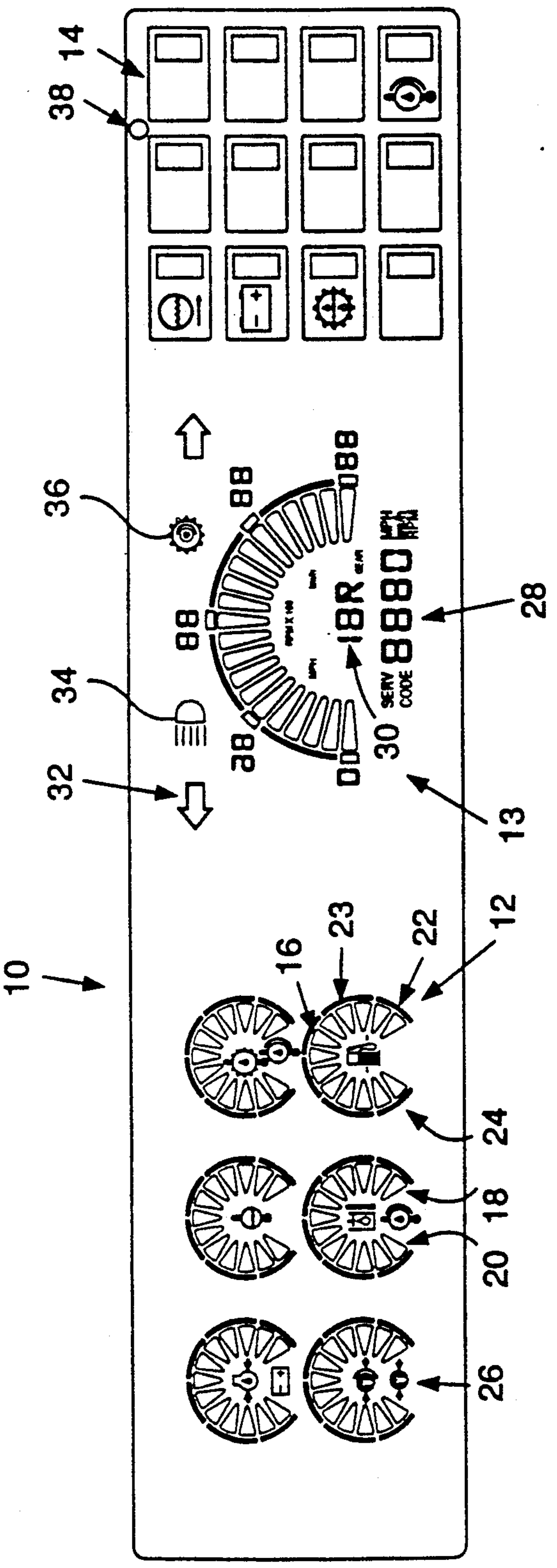
FIG. 1 is an illustration of a computerized diagnostic and monitoring system.

An instrument for displaying parameter values is shown generally by the reference numeral 10 in FIG. 1. In the preferred embodiment, the instrument 10 is a computerized diagnostic and monitoring system for monitoring and displaying parameters and informing an operator by visible and/or audible indications when a warning condition exists. The instrument 10 is advantageously microprocessor based and functions in response to internal software. The instrument 10 includes a plurality of indicator lights 14, preferably LEDs, and a plurality of electronic gauges 12 having a plurality of illuminable segments, preferably of the vacuum fluorescent (VF) type.

VF displays provide a visually attractive appearance; however, ambient light often causes VF display segments to appear to be illuminated even though the control to which the display is connected is not producing an electrical signal to illuminate the display segments. Thus, the display is difficult to read since there is very little contrast between segments that are illuminated by the control and those segments that appear to be illuminated due to ambient light.

Figure 2:
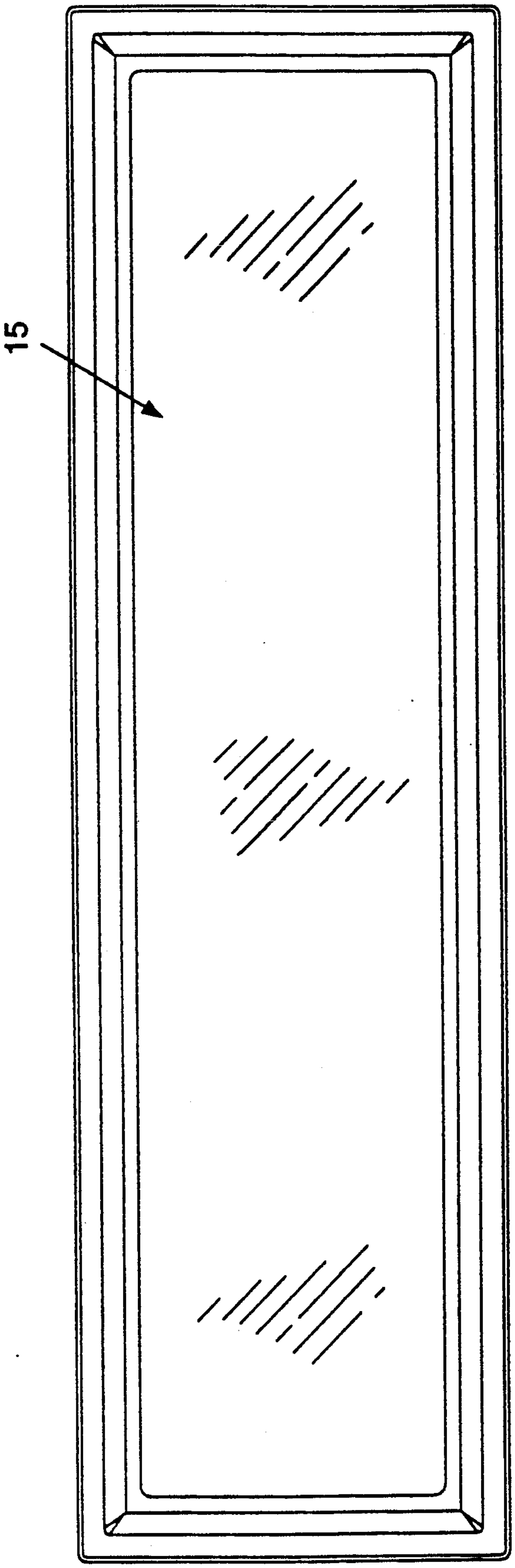
FIG. 2 is an illustration of a bezel and optical filter.

To improve contrast, an optical filter 15, shown in FIG. 2, must be provided to reduce the amount of ambient light reaching the VF display segments. Advantageously, the optical filter 15 is mounted in a bezel for mounting on the front of the instrument 10 over the VF display segments so that any ambient light must pass through the optical filter 15 before reaching the display segments and any light produced by illuminating the display segments must also pass through the optical filter 15. The optical filter 15 also advantageously includes anti-glare characteristics to improve readability for the operator.

Since ambient light is filtered as it enters the instrument 10 and any reflected light is also filtered, contrast is greatly improved. In the preferred embodiment, only the display segments that are illuminated by the instrument 10 are substantially visible to the operator.

The VF display segments are available in various different colors, for example blue, green, blue-green, yellow, and red. However, each of the colors are not of the same brightness when illuminated by the instrument 10. It is therefore advantageous to select the optical filter 15 such that each of the colors appear to be of approximately the same brightness to the operator, or alternatively for the warning colors to be somewhat brighter than the other segments. For example, since the blue-green display segments are typically brighter than the red and yellow display segments, the optical filter 15 preferably allows more energy in the yellow or red portion of the electromagnetic spectrum to pass through the filter than energy in the blue-green portion of the electromagnetic spectrum. In the preferred embodiment, the optical filter passes approximately 5% of the energy in the blue-green portion of the electromagnetic spectrum, approximately 7.5% of the energy in the yellow portion of the electromagnetic spectrum, and approximately 16 percent of the energy in the red portion of the electromagnetic spectrum. It should be understood, however, that the invention is in no way limited to these particular values and other transmissivity levels may be used in connection with the invention.

Referring back to FIG. 1, the gauges 12 preferably indicate the level of a plurality of sensed parameters, for example, ground speed, engine RPM, oil temperature, fuel level, transmission oil temperature, and the like, and may be used in connection with any of a plurality of different machine types. In the preferred embodiment, one of the gauges 12 is a speedo/tacho gauge 13 that displays either the speed of the vehicle or the RPM of the engine or transmission and includes scaling digits for displaying the magnitude of the sensed parameter at various points along the speedo/tacho gauge 13. Since the desired scaling digits may be different for each machine, the instrument 10 modifies the scaling digits in response to choices made by the designers of the machine to which the instrument 10 is connected.

Warning conditions are brought to an operator's attention by the indicator lights 14, a flashing gauge, a flashing alarm lamp, and/or a horn. Advantageously, the indicator lights 14 are lit in response to switch-type inputs being in a fault or warning condition.

When used in connection with some machines, it is also desirable for the instrument 10 to include turn signal indicators 32, a hi-beam light indicator 34, and a retarder indicator 36 for informing the operator that a transmission retarder is engaged on, for example, a large off-highway work vehicle. However, not all machines will use all functional indicators. Thus the instrument 10 controllably enables each of the functional indicators 32,34,36 that are needed by the machine to which the instrument 10 is connected. As is the case with the VF display segments associated with the gauges, the functional indicators are also of VF design and are substantially visible to the operator only when illuminated by the instrument.

The instrument 10 illustrated in FIG. 1 is sufficiently flexible to be used in connection with a number of different machines and to indicate a number of different parameters. For example, each gauge, except the central gauge indicating speedo/tacho information, is capable of indicating either a high warning condition or a low warning condition.

Each of the gauges 12 other than the speedo/tacho gauge 13 includes a plurality of indicating segments 16, high warning segments 18, and low warning segments 20. However, only a single high or low warning segment 18,20 may be used. The high warning segments 18 are advantageously located in the most clockwise position on the gauge 12 and the low warning segments 20 are located in the most counter-clockwise position on the gauge 12. When it is desirable to indicate the level of a parameter for which it is advantageous to indicate a warning when the parameter exceeds a certain level, for example engine temperature, the high warning segments 18 are enabled. To indicate the level of a parameter for which it is advantageous to indicate a warning when the parameter is below a certain level, for example fuel level, the low warning segments 20 are enabled. In some cases, it is advantageous to indicate both high and low warning conditions.

Advantageously, the gauges 12 also include a high outline segment 22, central outline segments 23, and a low outline segment 24, all of which being located around the periphery of each gauge and being illuminable. The high outline segment 22 is located adjacent the high warning segments 18 and the low outline segment 24 is located adjacent the low warning segments 20. The central outline segments 23 are located between the high and low outline segments 22,24. The central outline segments 23 are illuminated in response to the gauge 12 being used to indicate the level of a sensed parameter. In response to a parameter having a high warning value being indicated, the high outline segment 22 is illuminated; and in response to a parameter having a low warning value being indicated, the low outline segment 20 is illuminated. Thus, the appearance of the gauge 12 indicates that the displayed parameter has either a high or low warning level and better informs the operator that the level of the sensed parameter is approaching a warning level.

In the preferred embodiment, the high and low warning segments 18,20 are colored differently than the indicating segments 16; and the high and low outline segments 22,24 are colored differently from the central outline segments 23 and similarly to the high and low warning segments 18,20. Advantageously, the high and low warning segments 18,20 and high and low outline segments 22,24 are red and the indicating segments 16 and central outline segments 23 are blue-green. However, the low warning segments 20 and low outline segment 24 for the gauge 12 indicating fuel level are preferably yellow.

One or more of the gauges include a plurality of illuminable symbols 26 to identify the parameter being indicated. The symbols 26 are advantageously of VF design, blue-green in color, and selected from the symbols approved by ISO for indicating the parameters of interest. One of the symbols 26 is illuminated in connection with each gauge 12 so that the operator can identify the indicated parameter. Thus, the gauge 12 is capable of indicating the level of one of two or more different parameters by illuminating one of the symbols 26. The parameter, and hence symbol 26, selected for each gauge 12 depends on the vehicle to which the instrument 10 is connected and choices made by the vehicle and system designers.

A VF digital display 28 is included to indicate either speedometer or tachometer information in digital form. In the preferred embodiment, one of the speedo/tacho gauge 13 and digital display 28 indicates speedometer information while the other indicates tachometer information; however, either speedometer or tachometer information may be indicated on both if so desired. Advantageously, the digital display 28 is also adapted to indicate the level of other parameters when the instrument 10 is operating in a numeric readout mode or diagnostic information when the instrument 10 is operating in diagnostic modes.

The gauges 12 are capable of displaying the parameter values in a plurality of display modes, including a single-bar mode and a fill-the-graph mode. In the single-bar mode, only one of the indicating segments 16 is illuminated when the level of the sensed parameter is within the normal operating range. Thus, the appearance of the gauge 12 simulates the appearance of a mechanical gauge. In the fill-the-graph mode, the level of the sensed parameter is indicated by illuminating a plurality of indicating segments 16 such that the appearance of the gauge 12 simulates a bar graph.

Figure 3:
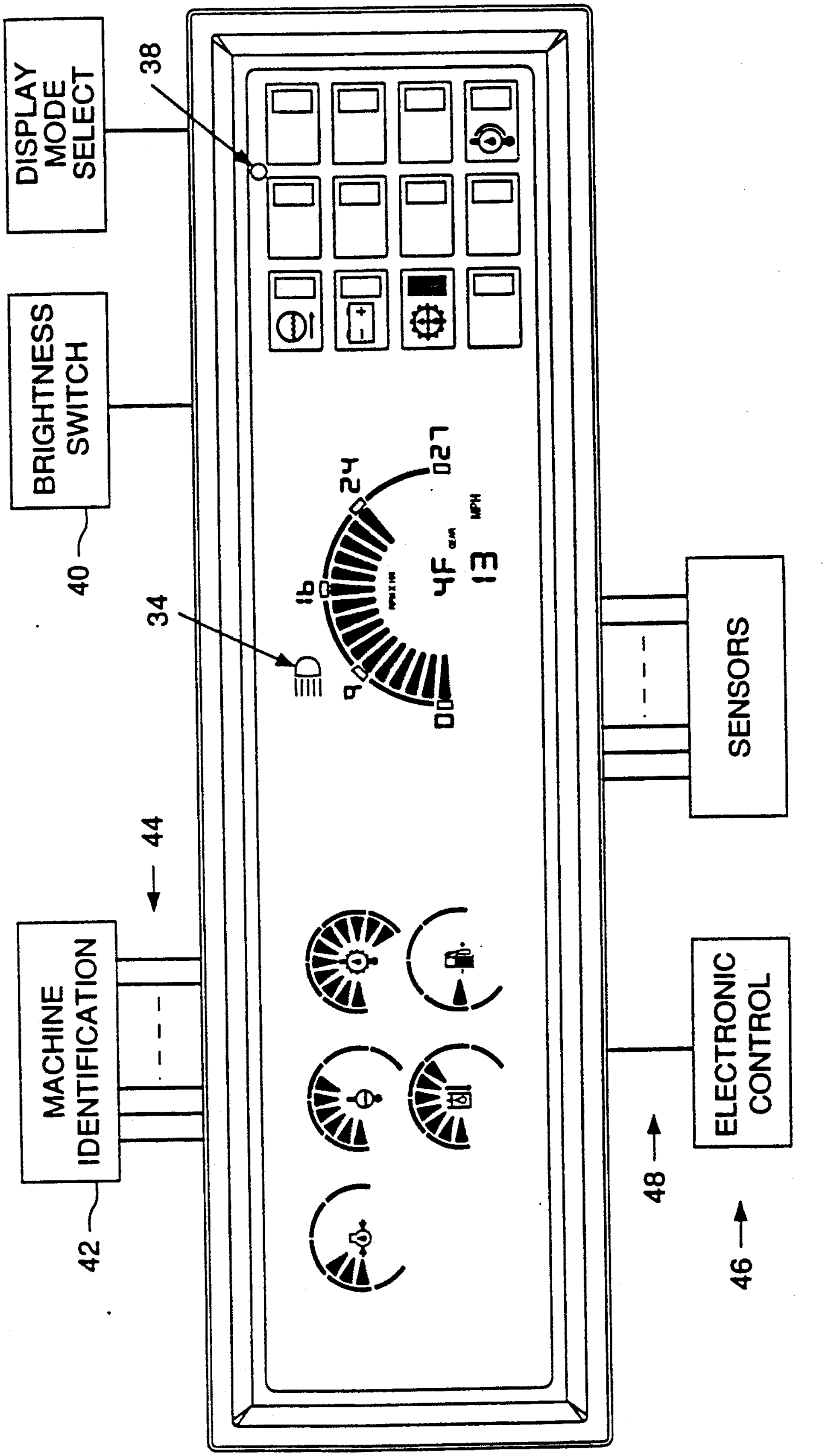
FIG. 3 is an illustration of a computerized diagnostic and monitoring system having a plurality of inputs and the bezel and optical filter shown in FIG. 2.

The instrument 10 selects a group of gauges and a display format for each parameter to be indicated on the machine type of interest. The instrument 10 is shown in FIG. 3 with the optical filter 15 placed over the face of the instrument 10 including the VF display segments so that only the segments being illuminated by the instrument 10 are substantially visible to the operator.

Advantageously, each machine type has an identification code to be delivered to the instrument which responsively reconfigures itself in response to the layout chosen by the designer for that machine. In response to the identification code, the instrument determines the parameter monitored at each input from the wire harness, the functional indicators to be illuminated, the type of display brightness control to be used, the parameter that is displayed on each gauge, the status report level for each input, the gauges to be used, the data to be transmitted over the communication link to another electronic control, the signal filtering, debounce, scaling, or averaging characteristics associated with each input, and the functional relationship between each parameter value and the gauge reading. One of the symbols 26 is illuminated for each gauge 12 in response to the identification code. Likewise, the switch-type input associated with each indicator light 14 is defined for each machine type on which the instrument 10 is used in response to the identification code.

The brightness of the VF display segments may be determined in a number of different ways depending on the machine to which the instrument is connected. In connection with some machines, the brightness level is determined solely in response to a photocell 38 that produces an electrical signal in response to the level of ambient light in a manner well-known in the art.

In connection with other machines, the brightness level is determined in response to both the photocell 38 and a brightness switch 40. The brightness switch may be either a single-pole, double-throw switch or a single-pole, single--throw switch. If the photocell 38 is to be used in tandem with a single-pole, double-throw momentary switch, the operator adjusts the brightness level either up or down from the value selected by the photocell 38, depending on which way the brightness switch 40 is activated. The single-pole, double-throw switch controls a brightness down input and a brightness up input in the instrument 10. When the brightness down input is grounded, the display brightness decreases in steps until the minimum brightness level is reached. When the brightness up input is grounded, the display brightness increases in steps until the maximum brightness level is reached.

In connection with still other machines, the brightness level is determined in response to both the photocell and a single-pole, single-throw switch. When the brightness switch input is grounded, the display brightness cycles; first the brightness decreases in steps to the minimum level, and then increases in steps to the maximum level.

An identification means 42 produces the identification code. In the preferred embodiment, the identification means 42 is connected to the instrument 10 via one or more identification lines 44 forming part of the wire harness and carrying the identification code.

In the preferred embodiment, the identification code is in the form of binary signals that are produced by connecting each of the identification lines 44 to a ground input potential or allowing the voltage of the identification line to float in response to any voltage to which the identification line 44 is connected. In the preferred embodiment, the identification means 42 directly connects the identification lines 44 to a terminal having one of the above described voltage characteristics; however, it should be appreciated that the identification lines 44 could be connected to a switch-type device for connection to a ground input potential or a floating terminal. While the preferred embodiment of the invention is described in connection with a ground input potential and a floating condition, it should be appreciated that the particular states of the binary signals could be modified without deviating from invention.

In general, the machine dependent functions and displays described above are determined in response to the identification code, although other inputs may be used to determine such things as whether the gauges 12 will display in the fill-the-graph or single-bar mode and whether speed will be displayed in MPH or km/h. Typically, the instrument 10 retrieves a number of identifiers from a memory device (not shown) within the instrument 10 in response to receiving the identification code. The instrument 10 then uses the identifiers to determine which functions and displays are to be used in connection with machines having the received identification code.

When used in connection with some machine types, the instrument 10 may also be connected to one or more electronic controls 46 via a communication link 48. In the preferred embodiment, the communication link 48 is a two-way serial communication link on which the instrument 10 can both transmit and receive information. In the preferred embodiment, the instrument 10 builds a serial data message which may include a module identifier corresponding to the electronic control 46 to receive the data, an identifier for each scaled parameter to be transmitted over the communication link, the scaled data representing the level of the parameter associated with each identifier, and the status of each switch-type input. Once the message is built, the instrument 10 transmits the message over the communication link 48.

Since the communication link 48 is typically used for other purposes, it is advantageous to reduce the amount of communications traffic on the communication link 48. This is possible because each machine does not include all of the possible electronic controls 46 and each of the electronic controls 46 does not require all of the sensor data that is available. Each of the electronic controls 46 may also require updates at different rates. The communication rate for each machine and electronic control is therefore also established in response to the identification code. As described above, the instrument 10 retrieves identifiers to determine what information is to be sent to which electronic control 46 and at what rate in response to the identification code.

Figure 4A:
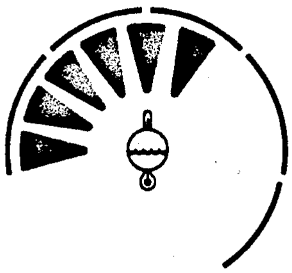
FIGS. 4*a* and 4*b* illustrate gauges indicating the level of parameters having a high warning value in the fill-the-graph mode.
Figure 4B:
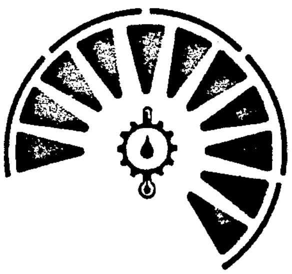

Referring now to FIGS. 4*a*–4*e*, the operation of the gauges 12 is described. As shown in FIGS. 4*a* and 4*b*, when it is desirable to indicate the level of a parameter for which it is advantageous to indicate a warning when the parameter exceeds a certain level, for example hydraulic oil temperature, on one of the gauges 12 in the fill-the-graph mode, the high warning segments 20 are enabled, the high outline segment 22 is illuminated, and the indicating segments 16 are progressively illuminated in the clockwise direction as the sensed parameter increases from a low level to a maximum warning level. FIG. 4*a* illustrates a parameter for which it is desirable to indicate a high warning condition and being within the normal operating range.

Figure 4C:
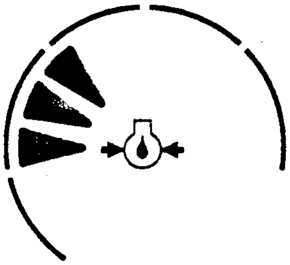
FIGS. 4*c* and 4*d* illustrate gauges indicating the level of parameters having a low warning level in the fill-the-graph mode.
Figure 4D:
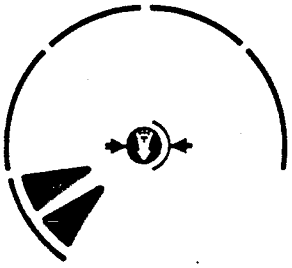

As shown in FIGS. 4*c* and 4*d*, a parameter for which it is advantageous to indicate a warning when the parameter is below a certain level, for example fuel level, is indicated in the fill-the-graph mode by enabling the low warning segments 18 and illuminating the low outline segment 24. The indicating segments 16 are illuminated to indicate the sensed parameter being at a high level and progressively turned off in the counter-clockwise direction as the level of the sensed parameter decreases. FIG. 4*c* illustrates a parameter for which it is desirable to indicate a low warning condition and being within the normal operating range.

Figure 4E:
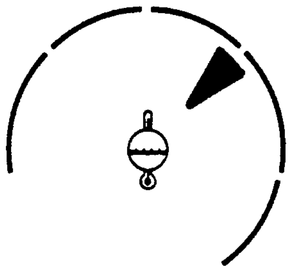
FIG. 4*e* illustrates a gauge indicating the level of a parameter having a high warning level in the single-bar mode.
Figure 5A:
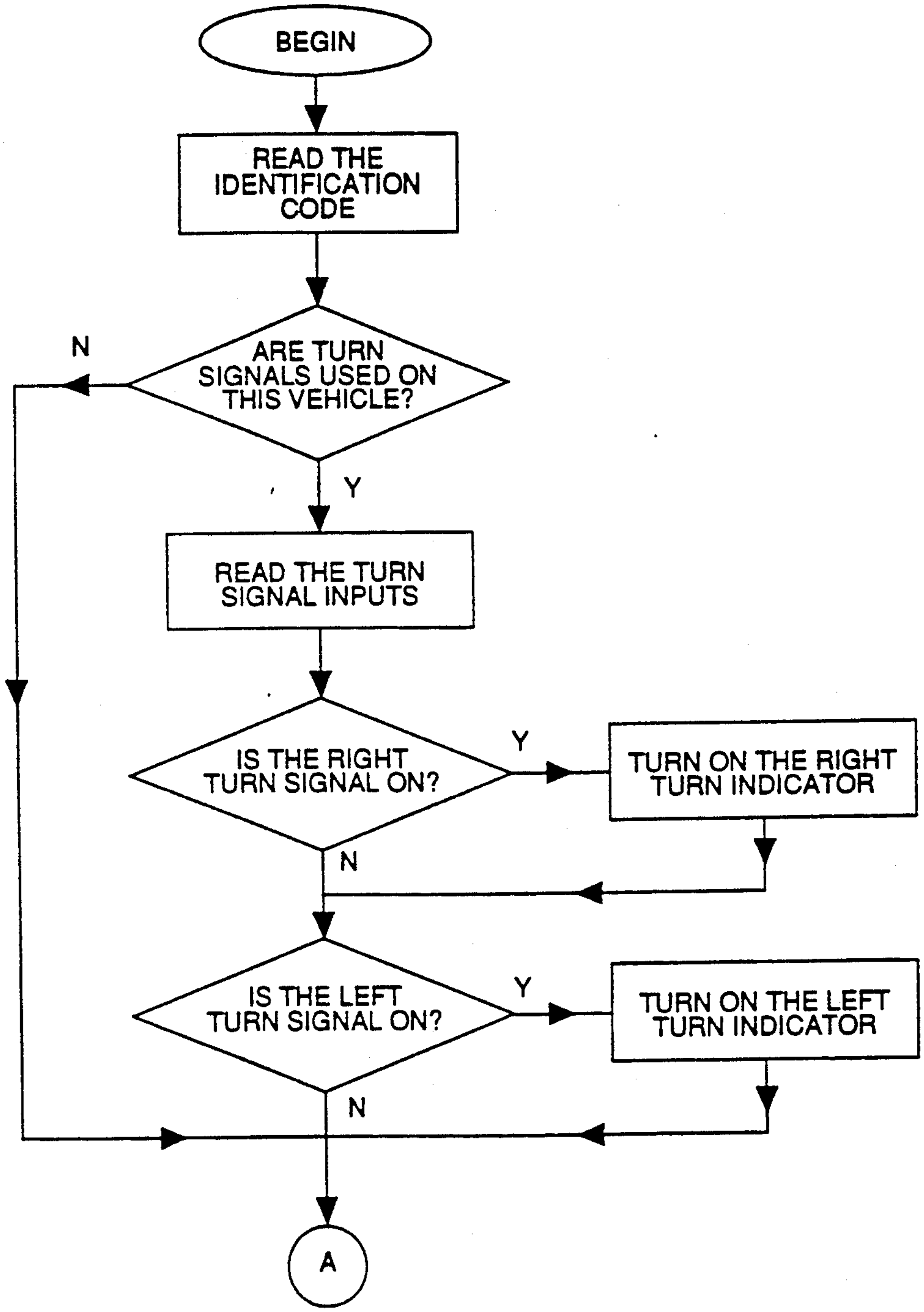
FIGS. 5*a* through 5*e* illustrate a flow chart of an algorithm used in connection with a preferred embodiment of the invention.
Figure 5B:
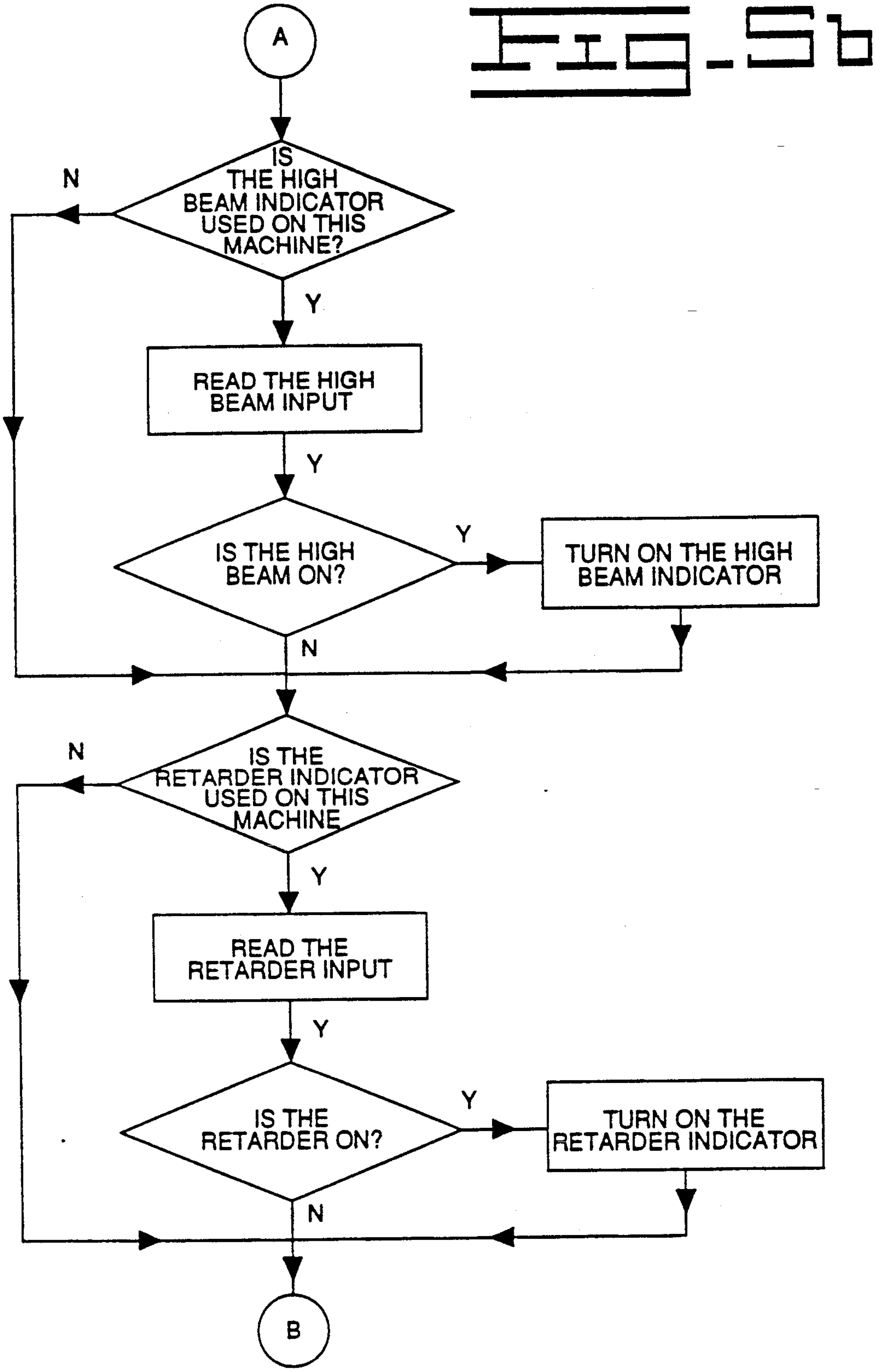
Figure 5C:
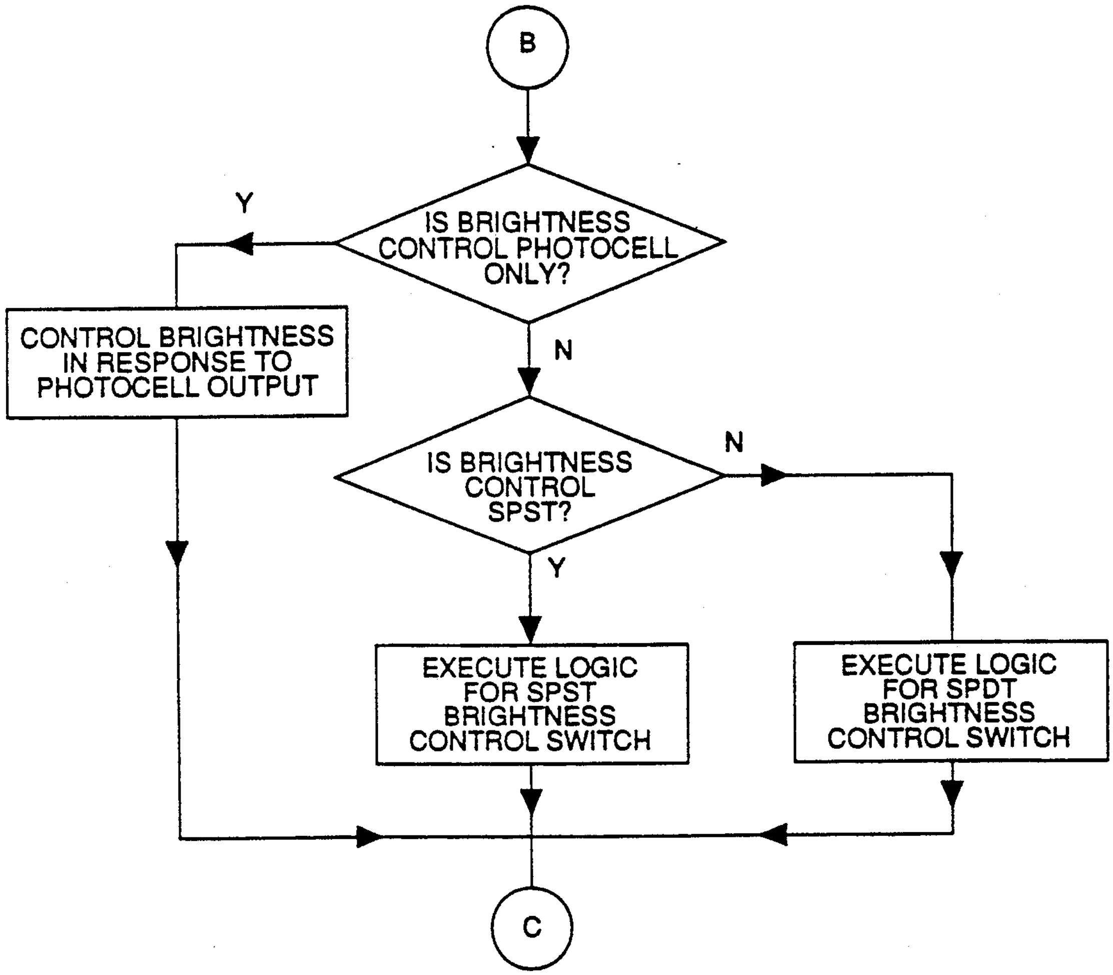
Figure 5D:
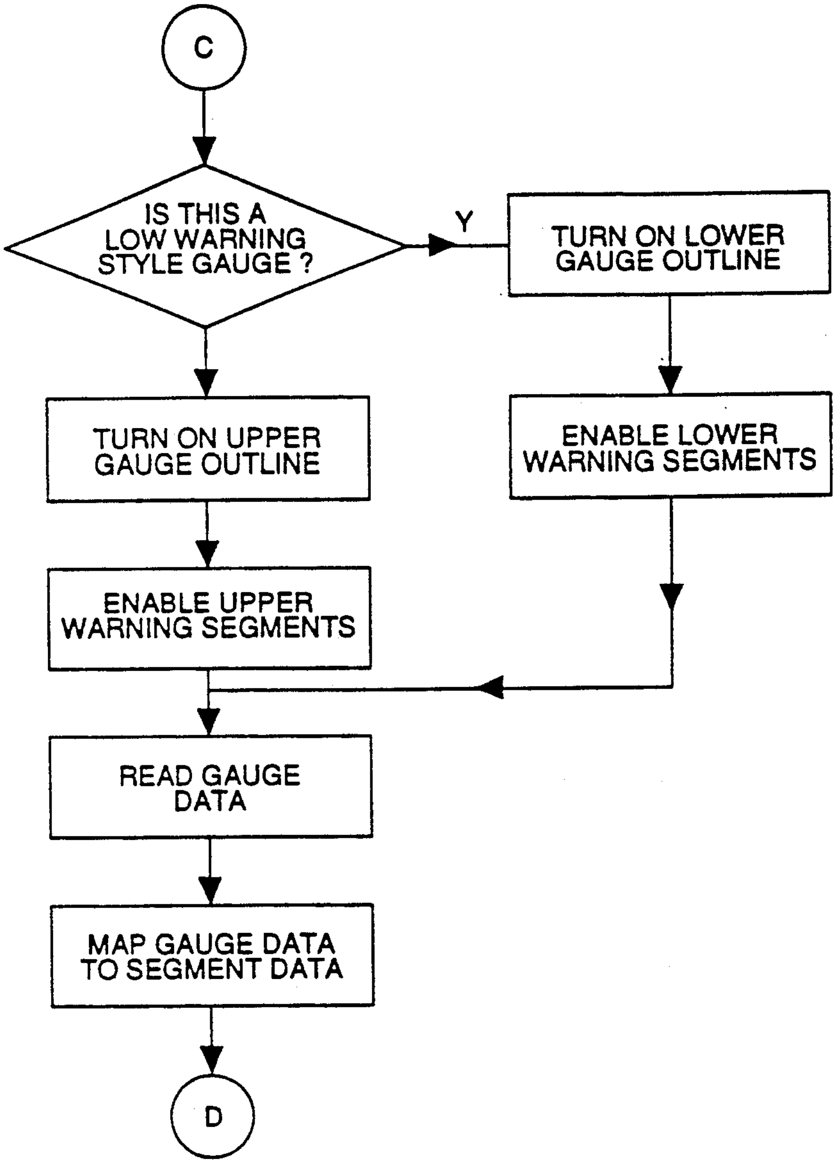
Figure 5E:
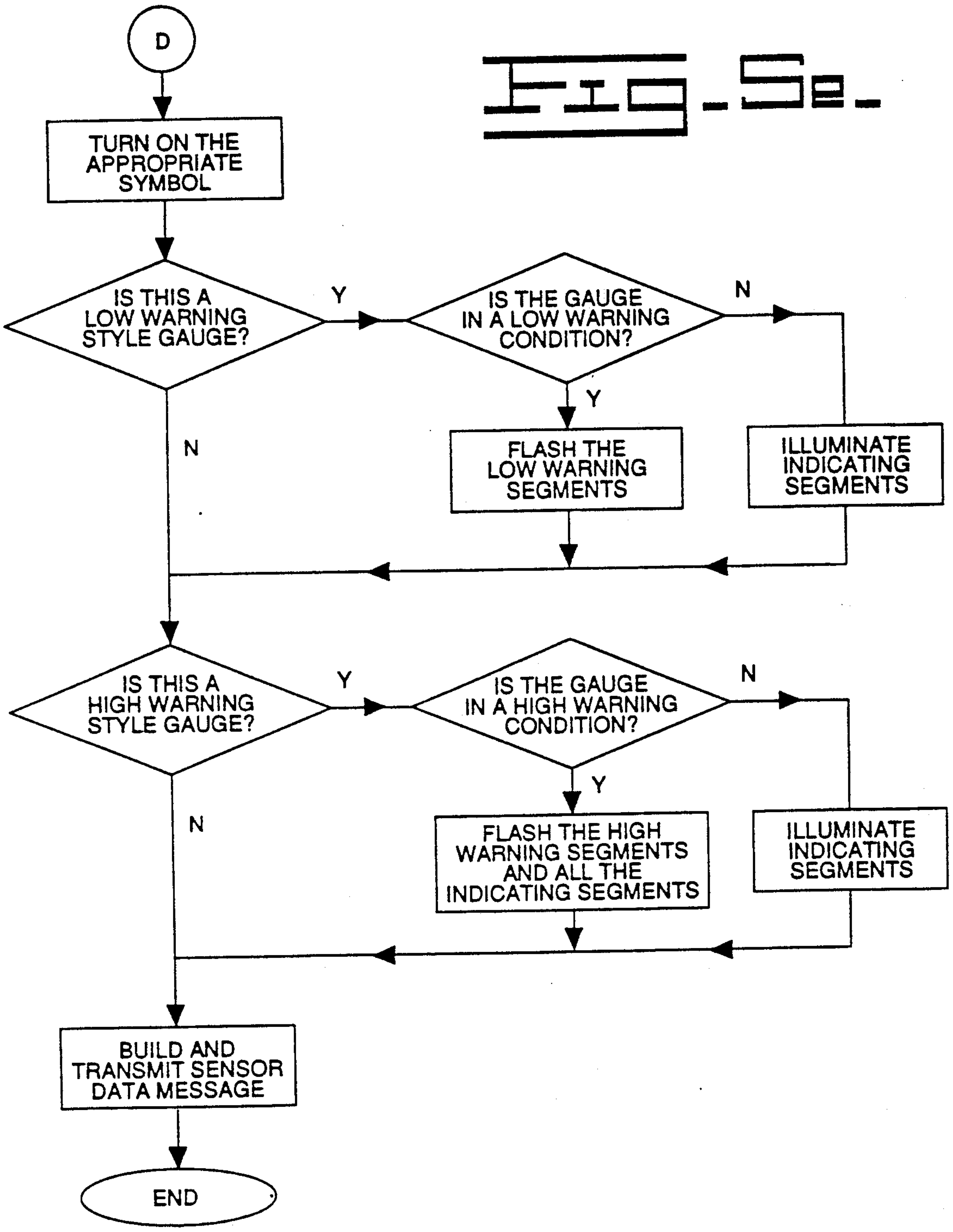

FIG. 4*e* illustrates a gauge 12 in the single-bar mode indicating the level of a sensed parameter for which it is desirable to indicate a warning when the parameter exceeds a certain level. The level of the sensed parameter is within the normal operating range. The indication of a parameter for which it is desirable to indicate a low warning condition in the single-bar mode would look similar to the gauge shown in FIG. 4*e* except the low outline segment 24 would be illuminated instead of the high outline segment 22.

For each parameter level being displayed on the gauge 12, a high or a low warning value is established as described below. The behavior of the gauge 12 in the fill-the-graph mode when the sensed parameter is above or below the high or low warning value, respectively, is best described in connection with FIGS. 4*b* and 4*d*.

For parameters having a high warning value, once the level of the sensed parameter exceeds the high warning value, all of the indicating segments 16, the central and high outline segments 22,23, the symbol 26, and one of the high warning segments 18 are caused to flash. As the level of the sensed parameter increases even farther, the second of the high warning segments 18 is also caused to flash. As shown in FIG. 4*b*, the sensed parameter has increased to a level at which all of the indicating segments 16, the symbol 26, the central and high outline segments 22,23, and both of the high warning segments 18 are all caused to flash.

With respect to a parameter having a low warning value, once the level of the sensed parameter decreases below the low warning value, the central and low outline segments 23,24, the symbol 26, and one of the low warning segments 20 are caused to flash. As the level of the sensed parameter decreases even farther, the second of the low warning segments 20 is also caused to flash. As shown in FIG. 4*d*, the sensed parameter has decreased to a level at which the central and low outline segments 23,24, the symbol 26, and both of the low warning segments 20 are all caused to flash.

The display of a sensed parameter in the single-bar mode when the level of the sensed parameter is above the high warning value includes the flashing of the central and high outline segments 22,23, the symbol 26, and one of the high indicating segments 18. Similarly, the display of a sensed parameter being below the low warning value in the single-bar mode includes the flashing of the central and low outline segments 23,24, the symbol 26, and one of the low indicating segments 20. Which of the two high or low indicating segments 18,20 to be flashed is determined in response to the degree to which the level of the sensed parameter is above or below the high or low warning values, respectively.

In addition to the above warning indications, the warning horn or the alarm lamp may be activated when the level of the sensed parameter exceeded the high or low warning value.

A gear display 30 is advantageously disposed adjacent the digital display 28. The gear display 30 indicates the number and direction, i.e. forward, neutral, or reverse, of the vehicle transmission.

The indicator lights 14 indicate various system faults or warning conditions. In the preferred embodiment, one or more of the indicator lights 14 are associated with warning conditions of parameters indicated by the gauges 12.

The instrument 10 is connected to each of a plurality of sensors by a wire harness. The instrument 10 preferably performs some processing of signals received from the sensors over the wire harness and scales the signals received from pulse-width modulated type sensors and frequency based sensors in manners well-known in the art.

Similarly, the instrument 10 receives signals from switch-type sensors. The signals associated with these inputs are received by the instrument 10, but generally no scaling is required. These switch-type inputs advantageously include devices for indicating whether a high-beam switch is activated, whether a retarder is engaged, and whether a turn signal switch is activated.

In the preferred embodiment, the instrument 10 executes the algorithm illustrated by the flow chart in FIGS. 5*a–e*. The instrument 10 reads the identification code from the identification means 42 and determines whether the turn signal indicators 32 are to be enabled by retrieving a turn signal identifier from a memory device (not shown) within the instrument 10 in response to the identification code. If the turn signal indicators 32 are enabled, the instrument 10 reads the turn signal, switch-type inputs and determines whether each of the left or right turn signal indicator 32 is to be activated. The instrument 10 responsively causes the left or right turn signal indicator 32 to flash if either the left or right turn signal is activated, respectively.

The instrument 10 determines whether the high beam indicator 34 is to be enabled in response to an identifier retrieved from memory (not shown) in response to the identification code. If the high beam indicator 34 is enabled, the instrument 10 reads the high beam, switch-type input and determines whether the high beam indicator should be illuminated. The instrument 10 responsively illuminates the high beam indicator 34 if the high beam input is at a state being defined to indicate that the high beam lights are activated.

The instrument 10 determines whether the retarder indicator 36 is to be enabled in response to an identifier retrieved from memory (not shown) in response to receiving the identification code. If the retarder indicator 36 is enabled, the instrument 10 reads the retarder, switch-type input (not shown) and determines whether the retarder indicator 36 should be illuminated. The instrument 10 responsively illuminates the retarder indicator 36 if the retarder input is at a state being defined to indicate that the retarder is engaged.

In response to the identification code of the machine, the instrument 10 retrieves a display brightness identifier from memory (not shown). The display brightness identifier informs the instrument 10 whether the display brightness level is to be controlled in response to a photocell 38 only, a photocell 38 and a single-pole, single-throw switch 40, or a photocell 38 and a single-pole, double-throw switch 40. The display brightness identifier thus has one of three states being defined within the instrument 10 to control the display brightness level in one of the three manners.

If the display brightness identifier indicates that the brightness level is to be controlled in response to the photocell 38 only, the instrument 10 reads a control signal from the photocell input only. The signal from the photocell 38 is dependent upon the level of ambient light. Thus the instrument 10 is able to adjust the drivers of the VF display segments to control the display brightness level in response to the level of ambient light.

If the display brightness identifier indicates that the brightness level is to be controlled in response to the photocell 38 and a single-pole, single-throw switch (SPST), the instrument 10 reads control signals from both the photocell input and the brightness switch input. The signal from the photocell 38 is dependent upon the level of ambient light and the signal from the brightness switch 40 is dependent upon operator action. The control signals from the photocell 38 and SPST switch 40 work in tandem to cause the instrument 10 to control display brightness. The photocell 38 controls the brightness level as described above; however, the operator can manually adjust the brightness level by actuating the SPST switch 40.

When the brightness switch input is grounded, the instrument 10 responsively cycles the display brightness level. First the instrument 10 decreases the brightness level in steps to the minimum level, and then increases the brightness level in steps to the maximum level. The magnitude of the steps are selected in response to the desired degree of control and the desired number of actuations required in one cycle of brightness levels. After the display brightness has been manually adjusted, the photocell continues to control display brightness as described above in response to changes in the ambient light level.

If the display brightness identifier indicates that the brightness level is to be controlled in response to the photocell 38 and a single-pole, double-throw (SPDT) momentary switch 40, the instrument 10 reads control signals from the photocell input and the two brightness switch inputs from the SPDT switch 40 known as the brightness up and brightness down inputs. The signal from the photocell 38 is dependent upon the level of ambient light and the signal from the brightness switch 40 is dependent upon operator action.

The control signals from the photocell 38 and SPDT switch 40 work in tandem to cause the instrument 10 to control display brightness. The photocell 38 controls the brightness level as described above; however, the operator can manually adjust the brightness level by actuating the SPDT switch 40 in each of the two directions. The operator adjusts the brightness level either up or down from the value selected by the photocell 38, depending on which way the SPDT switch 40 is activated. The SPDT switch 40 controls a brightness down input and a brightness up input.

The instrument 10 adjusts the drivers of the VF display segments to control the display brightness level in response to the photocell input and the brightness up and brightness down inputs. When the brightness down input is grounded, the instrument 10 decreases the display brightness level in incremental steps until the minimum brightness level is reached. When the brightness up input is grounded, the display brightness increases in steps until the maximum brightness level is reached. The magnitude of the steps are selected in response to the desired degree of control and the desired number of actuations required in one cycle of brightness levels. After the display brightness has been manually adjusted, the photocell 38 continues to control the display brightness level as described above in response to the ambient light level.

For each of the gauges other than the speedo/tacho gauge 13, the instrument 10 determines whether the gauge is a high or low warning style gauge. Advantageously, this is determined by retrieving a gauge style identifier from memory within the instrument 12 for each gauge to be used. The gauge style identifier is retrieved from the memory device in response to the identification code. Each of the gauge style identifiers are selected in response to choices made by the vehicle designers regarding which parameters are to be displayed and the preferred display format for each parameter.

If the gauge is a low warning style gauge, the low outline segment 24 is illuminated and the low warning segments 20 are enabled 42. If the gauge is a high warning style gauge, the high outline segment 22 is illuminated and the high warning segments 18 are enabled.

The instrument 10 reads the sensor signals from the wire harness. Since the sensor signals may be in the form of pulse-width modulated signals, frequency signals, or switch-type binary signals, the instrument 10 converts and scales the inputs to a microprocessor readable form in manners well-known in the art. For example, if the output from one of the pulse-width modulated sensors is sensing oil pressure and has a duty cycle of 70% and the range of the scaled signal is from 0–255, the binary number 179 is assigned to the oil pressure parameter.

In response to the scaled signal from the pulse-width modulated and frequency sensors, the instrument 10 determines which segments are to be illuminated on each gauge. In the preferred embodiment, the memory device (not shown) includes a plurality of stored parameter values corresponding to each possible magnitude of the scaled data for each sensed parameter. The memory device (not shown) also includes a plurality of segment numbers included in a look-up table of a type well-known in the art to indicate the number of segments to be illuminated in response to each of the stored parameter values. The instrument 10 thus maps the parameter value to the number of segments to be illuminated on the associated gauge. Alternatively, an equation could be developed defining the relationship between the parameter values and the segment commands and could be solved in place of the use of the look-up table. Similarly, the scaled data could be mapped directly to the segment numbers.

In the preferred embodiment, the high and low warning segments 18,20 and indicating segments 16 are numbered, starting with the most counter-clockwise positioned segment and progressing in the clockwise direction, from 0 through 12. Provided that the sensed parameter is not below the low warning value, neither of the low indicating segments 20 are illuminated. Thus, if the number 7 is retrieved as the number of segments to indicate in the fill-the graph mode, then segments 2 through 7 are illuminated as shown in FIG. 4*a*. If the number 12 is retrieved as the number of segments to indicate in the fill-the-graph mode and the gauge is a high warning style gauge, then segments 2 through 12 are caused to flash as shown in FIG. 4*b*. If the number 4 is retrieved as the number of segments to indicate in the fill the graph mode and the gauge is a low style warning gauge, then segments 2 through 4 are illuminated as shown in FIG. 4*c*. If the number 0 is retrieved as the number of segments to indicate in the fill-the-graph mode and the gauge is a low style warning gauge, then segments 0 and 1 are caused to flash as shown in FIG. 4*d*. If the gauge is in the single-bar mode, then the segment corresponding to the retrieved number is the only one of the warning and indicating segments 16,18,20 that is illuminated or caused to flash.

If the number 0 or 1 is retrieved, the parameter is considered to be below the low warning value, and if the number 11 or 12, the parameter is considered to be above the high warning value.

In keeping with the above example, suppose that the scaled data received from the instrument and associated with the oil pressure in an engine is 179 and that the oil pressure is to be displayed in the low warning format. The instrument would retrieve for example the number 6 from the look-up table and segments 2 through 6 would be illuminated if in the fill-the-graph mode.

If the gauge includes a plurality of symbols 26, the instrument 10 produces a control signal to illuminate one of the symbols 26 in response to a symbol identifier that is retrieved from the memory device (not shown). In the preferred embodiment, the gauge includes two symbols and the symbol identifier indicates which of the two symbols 26 should be illuminated in response to the parameter assigned to that gauge. Since the parameter assignment is made in response to the identification code, the symbol identifier is also advantageously retrieved in response to the identification code.

The instrument determines whether the gauge is a high or low warning style gauge in response to the gauge style identifier described above. If the gauge is a low warning style gauge, the gauge either illuminates or flashes the appropriate portions of the gauge in response to the retrieved segment number determined as described above. Similarly, if the gauge is a high warning style gauge, the instrument 10 either illuminates or flashes the appropriate portions of the gauge in response to the retrieved segment number determined as described above.

In response to the switch-type inputs, the electronic control 20 determines whether and which indicator lights 14 should be illuminated in a manner well-known in the art. For example, if the data message associated with a particular switch-type input indicates that the switch-type sensor has been activated in response to a fault condition, warning condition, or the like, the indicator light 14 associated with that switch-type sensor is illuminated.

The instrument 10 retrieves a communication identifier from memory in response to the identification code. The instrument 10 responsively determines which sensor data is to be transmitted to which electronic controls 46. The communication identifier advantageously includes a group of commands of a type well-known in the art instructing the instrument 10 to build and transmit a serial data message.

The communication identifier preferably also includes a command establishing the period of time between data transmissions so the sensor data being sent to each of the electronic controls 46 is updated at the appropriate rate. The instrument 10 responsively builds and transmits the serial data message over the communication link 48 at the desired rate.

INDUSTRIAL APPLICABILITY

The operation of an embodiment of the present invention is best described in relation to its use in displaying a plurality of parameter levels and operating conditions on a vehicle. The instrument 10 advantageously has six circular gauges 12. Four of the six gauges 12 allow the option of displaying one from a choice of two parameters. The parameter being displayed by each gauge is identified by an ISO symbol 26 near the center of the gauge 12. Gauge usage, the parameter displayed, and the ISO symbol 26 identifying the displayed parameter are defined in software and are vehicle dependent.

In response to an identification code being received, the instrument 10 assigns each of the sensed parameters to a gauge 12. The gauges 12 each include indicating segments forming the middle portion of the gauge with two warning segments at both the top and bottom of the gauge. For each gauge, the high warning segments are enabled if the instrument 10 assigns a parameter to that gauge 12 for which it is desirable to indicate a warning condition when the parameter exceeds a certain level; whereas the low warning segments are enabled if the instrument 10 assigns a parameter for which it is desirable to indicate a warning condition when the parameter is below a certain level.

When a gauge 12 is to be used to indicate a parameter level, the central outline segments 23, one of the high or low outline segments 22,24, and the appropriate ISO symbol 26 are illuminated. If a gauge is not being used on a particular machine, the symbol 26 and outline segments 22,23,24 are not illuminated. Since the optical filter only allows the VF displays to be substantially visible when the segments are illuminated by the instrument 10, the gauge segments 22,23,24 and symbols 26 are not visible when not being used to indicate a parameter level.

The instrument 10 is programmed so that a normal operating level for each gauge on a given vehicle is close to the center of the gauge. For this reason the scaling for each gauge is both parameter and vehicle dependent and is established by the instrument in response to the identification code.

On some vehicles where turn signals are unnecessary or the function is performed by devices outside the instrument 10, the turn signal indicators 32 are disabled. Similarly, the high-beam indicator 34 and retarder indicator 36 are disabled if unnecessary for use in connection with a given vehicle. As is the case with the gauges, the turn signal indicators 32, retarder indicator 36, and high beam indicator 34 are not substantially visible unless illuminated.

There are advantageously three different ways to control the brightness of the instrument displays. Some machine designers select only a photocell, while others select a photocell in conjunction with a single-pole, single-throw switch, and still other designers select a photocell in conjunction with a single-pole, double-throw switch. The instrument 10 controls the brightness level in response to the selection made by the machine designers by reading the identification code and responsively executing the control logic for that selection.

In some cases, the instrument 10 is also connected to another electronic control 46 via a communication link 48. Any data received by the instrument 10 may be transmitted to any other electronic control 46 if needed. To minimize traffic on the communication link 48 which may also be used for many other functions, transmitting of parameter data is enabled or disabled in response to the needs of the particular vehicle to which the instrument is connected. Since different electronic controls 46 on different machines require the sensor information to be updated at different rates, the time interval between each transmission of sensor data from the instrument 10 is also determined in response to the identification code.

Any specific values used in the above descriptions should be viewed as exemplary only and not as limitations. Other aspects, objects, and advantages of this invention can be obtained from a study of the drawings, the disclosure, and the appended claims.

We claim:

1. A method for indicating levels of sensed parameters on any of a plurality of vehicles, comprising the steps of:

producing an identification code, each of the plurality of vehicles having an identification code for identifying the type of brightness controls to be used in connection with that vehicle;

indicating a level of the sensed parameters on a plurality of gauges, each of the gauges has an outline segment for illustrating a range of levels of the sensed parameter being indicated by the gauge and a symbol for identifying the sensed parameter indicated by each gauge, each of said outline segments and symbols being selectively illuminable in response to an electrical control signal;

providing the identification code to a controller;

selectively enabling one or more of the gauges and selectively illuminating the outline segment and symbol associated with each of the enabled gauges in response to the identification code; and providing an optical filter between an operator and the outline segment, gauge, and symbol whereby the outline segment, gauge, and symbol are substantially visible to the operator only when illuminated.

2. A method, as set forth in claim 1, wherein the outline segment and the symbol are substantially visible to an operator only when illuminated by the controller.

3. A method, as set forth in claim 1, including the step of controllably enabling a turn signal and a high-beam indicator in response to the identification code.

4. A method, as set forth in claim 1, including the step of controllably enabling a retarder indicator in response to the identification code.

5. A method, as set forth in claim 1, wherein gauge and symbol are illuminated at a brightness level and including the step of controlling the intensity at which said gauge and symbol means are illuminated in response to a photocell and one of a plurality of brightness switches.

6. A method, as set forth in claim 5, including the step of identifying which of the plurality of brightness switches is to be used in response to the identification code.

7. A method, as set forth in claim 6, including the step of producing data in response to the sensed parameters and selectively transmitting the data to an external electronic control via a communication link in response to the identification code.

8. An apparatus for indicating levels of sensed parameters on any of a plurality of vehicles, comprising:

sensor means for producing parameter signals indicative of the levels of the sensed parameters;

means for producing an identification code, each of the plurality of vehicles having a unique identification code for identifying the vehicle to which the apparatus is connected;

a plurality of gauge means for indicating a level of the sensed parameters, each of said gauge means having an outline segment means for illustrating a range of levels of the sensed parameter indicated by said gauge means and a symbol means for identifying the sensed parameter indicated by said gauge means, said outline segment means and symbol means being illuminable;

control means for receiving said identification code and said parameter signals;

a second electronic control; and a communication link connected to and between said control means and said second electronic control, said control means producing data in response to said parameter signals and selectively transmitting all or a portion of said data to said external electronic control via said communication link in response to said identification code, whereby said data transmitted via said communication link is uniquely determined for each vehicle in response to said identification code.

9. An apparatus, as set forth in claim 8, wherein said control means transmits said data at regular time intervals being determined in response to said identification code.

10. An apparatus for indicating levels of sensed parameters on any of a plurality of vehicles, comprising:

means for producing an identification code, each of the plurality of vehicles having an identification code for identifying a particular gauge configuration for use in connection with that vehicle;

a plurality of gauge means for indicating a level of the sensed parameters, each of said gauge means having an outline segment means for illustrating a range of levels of the sensed parameter indicated by said gauge means and a plurality of symbol means for identifying the sensed parameter being indicated on each of said plurality of gauge means, each of said outline segment means and symbol means being selectively illuminable in response to an electrical control signal;

control means for receiving said identification code and, in response to said identification code, selectively enabling one or more of said gauges and selectively producing said electrical control signal for each of said outline segment means and symbol means associated with each of the enabled gauge means whereby only the outline segment means and symbol means associated with the desired gauge configuration of the vehicle indicated by the identification code are illuminated; and optical filter means for causing said outline segment means and said symbol means to be substantially visible to an operator only when illuminated by said control means.

11. An apparatus, as set forth in claim 10, including a turn signal being illuminable and a high-beam indicator being illuminable and said control means selectively enables said turn signal and high-beam indicator in response to said identification code and wherein said optical filter means causes said turn signal and high-beam indicator to be substantially visible to an operator only when illuminated by said control means.

12. An apparatus, as set forth in claim 10, including a retarder indicator being illuminable and said control means selectively enables said retarder indicator in response to said identification code and wherein said optical filter means causes said retarder indicator to be substantially visible to an operator only when illuminated by said control means.

13. An apparatus, as set forth in claim 10, wherein said outline segment means and symbol means are illuminated at a brightness level and including a photocell means for controlling the intensity at which the outline segment means and symbol means are illuminated and means for determining whether a brightness switch means for controlling the intensity at which the outline segment means and symbol means are illuminated is included in response to said identification code.

14. An apparatus, as set forth in claim 10, wherein said outline segment means and symbol means are illuminated at a brightness level and including a photocell means and one of a plurality of brightness switch means for controlling the intensity at which said outline segment means and symbol means are illuminated, and wherein said control means identifies which of the plurality of brightness switch means is included in response to said identification code and establishes said brightness level in response to said photocell means and said one of a plurality of brightness control means.

15. An apparatus, as set forth in claim 14, wherein said plurality of brightness switch means includes a single-pole, single-throw switch and a single-pole, double-throw switch.

16. An apparatus, as set forth in claim 14, wherein said photocell means controls said brightness level in one of a plurality of brightness ranges and said brightness switch means selects the brightness range in which the photocell means controls said brightness level.

17. An apparatus for indicating levels of sensed parameters on any of a plurality of vehicles, comprising:

means for producing an identification code, each of the plurality of vehicles having an identification code for identifying the type of brightness controls to be used in connection with that vehicle;

a plurality of gauge means for indicating a level of the sensed parameters, each of said gauge means having an outline segment means for illustrating a range of levels of the sensed parameter indicated by said gauge means and a symbol means for identifying the sensed parameter indicated by said gauge means, said outline segment means and symbol means being illuminable at a brightness level;

a photocell;

one of a plurality of brightness switches,; and a control means for identifying which of said plurality of brightness switches is to be used in conjunction with the photocell in response to said identification code and for establishing said brightness level in response to both said photocell and said one of said plurality of brightness switches.

18. An apparatus for indicating levels of sensed parameters on a vehicle, comprising:

instrument means for displaying a plurality of parameters, said instrument means including a microprocessor;

means for producing a vehicle identification code and delivering said code to said instrument means;

a plurality of electronic controls each being adapted to control different vehicle functions; and a communication link connecting the electronic controls to said instrument means and delivering a serial data message including the vehicle identification code and an electronic control identifier to said plurality of controls.

19. An apparatus for indicating levels of sensed parameters on a vehicle, comprising:

means for producing an identification code, each of the plurality of vehicle types having a unique identification code for identifying the type of brightness controls to be used in connection with the associated vehicle type;

a plurality of gauge means for indicating a level of the sensed parameters, each of said gauge means having an outline segment means for illustrating a range of levels of the sensed parameter indicated by said gauge means and a symbol means for identifying the sensed parameter indicated by said gauge means, said outline segment means and symbol means being illuminable at a brightness level;

a photocell means for controlling the intensity at which the outline segment means and symbol means are illuminated; and means for determining in response to said identification code whether a brightness switch is to be used in connection with said photocell means to collectively control the intensity at which the outline segment means and symbol means are illuminated.

* * * * *

UNITED STATES PATENT AND TRADEMARK OFFICE

CERTIFICATE OF CORRECTION

PATENT NO. : 5,327,344

DATED : July 5, 1994

INVENTOR(S) : JOHN P. HOFFMAN ET AL

It is certified that error appears in the above-identified patent and that said Letters Patent is hereby corrected as shown below:

Delete claim 2, column 14, lines 21 through 23.

Signed and Sealed this

Twenty-ninth Day of November, 1994

*Attest:*

BRUCE LEHMAN

*Attesting Officer*

*Commissioner of Patents and Trademarks*